(12) United States Patent
Nevitt et al.

(10) Patent No.: US 9,706,856 B1
(45) Date of Patent: Jul. 18, 2017

(54) FOOD-RETAINING NET FOR USE WITH A FOOD TRAY AND HIGH CHAIR

(71) Applicants: Greg Nevitt, Bradenburg, KY (US); Cari Bradley, Bradenburg, KY (US)

(72) Inventors: Greg Nevitt, Bradenburg, KY (US); Cari Bradley, Bradenburg, KY (US)

(*) Notice: Subject to any disclaimer, the term of this patent is extended or adjusted under 35 U.S.C. 154(b) by 37 days.

(21) Appl. No.: 14/988,840

(22) Filed: Jan. 6, 2016

(51) Int. Cl.
| *A47B 97/00* | (2006.01) |
| *A47B 31/00* | (2006.01) |
| *A47D 15/00* | (2006.01) |
| *F16B 1/00* | (2006.01) |
| *A47D 1/00* | (2006.01) |

(52) U.S. Cl.
CPC .............. *A47D 15/00* (2013.01); *A47D 1/008* (2013.01); *F16B 1/00* (2013.01); *F16B 2001/0028* (2013.01); *Y10T 29/49826* (2015.01)

(58) Field of Classification Search
CPC ...... A47D 1/00; A47D 15/00; Y10T 29/49826
USPC ........ 297/463.1, 463.2, 182, DIG. 6; 29/428
See application file for complete search history.

(56) References Cited

U.S. PATENT DOCUMENTS

| 1,050,205 | A | | 1/1913 | Conley | |
| 2,540,685 | A | | 2/1951 | Mayer | |
| 2,585,434 | A | * | 2/1952 | Caponera | A47G 27/0206 |
| | | | | | 297/182 |
| 2,827,953 | A | * | 3/1958 | Jones | A47D 15/00 |
| | | | | | 297/182 |
| 2,938,574 | A | * | 5/1960 | Brown | A47D 15/00 |
| | | | | | 297/182 |
| 3,298,736 | A | * | 1/1967 | Decker | A47D 15/00 |
| | | | | | 297/182 |
| 4,659,143 | A | * | 4/1987 | MacLennan | A47D 1/106 |
| | | | | | 297/174 CS |
| 5,820,210 | A | * | 10/1998 | Shipman | A47C 7/62 |
| | | | | | 297/188.01 |
| 6,053,570 | A | * | 4/2000 | Stern | A47C 7/62 |
| | | | | | 211/86.01 |
| D442,789 | S | | 5/2001 | Presnell | |
| 6,532,595 | B1 | * | 3/2003 | Holmes | A47D 1/008 |
| | | | | | 2/48 |
| 7,891,731 | B2 | * | 2/2011 | O'Toole | A47D 1/00 |
| | | | | | 297/182 |
| 8,840,177 | B2 | | 9/2014 | Ballard | |
| 2008/0185881 | A1 | | 8/2008 | Romaniuk et al. | |
| 2008/0191529 | A1 | * | 8/2008 | Guercia | A47C 31/11 |
| | | | | | 297/229 |
| 2009/0127917 | A1 | * | 5/2009 | Foenander | A47D 1/00 |
| | | | | | 297/463.1 |
| 2011/0089652 | A1 | * | 4/2011 | Unnerstall, Jr. | B62B 3/04 |
| | | | | | 280/33.996 |

(Continued)

*Primary Examiner* — Chi Q Nguyen
(74) *Attorney, Agent, or Firm* — Kyle A. Fletcher, Esq.

(57) ABSTRACT

The food-retaining net for use with a food tray and high chair is a barrier that prevents objects from falling or being knocked off the tray of a high chair. The food-retaining net for use with a food tray and high chair is a framework structure that partially surrounds the tray of a high chair. The framework structure is covered with a mesh fabric that forms the barrier to prevent objects from falling off the falling or being knocked off the tray of a high chair. The framework structure is directly attached to the tray of the high chair using a fastener. The food-retaining net for use with a food tray and high chair further comprises a mesh textile and a framework structure.

13 Claims, 5 Drawing Sheets

(56) References Cited

U.S. PATENT DOCUMENTS

2012/0286546 A1* 11/2012 Ballard .................. A47D 15/00
297/182
2014/0319887 A1 10/2014 Ing

* cited by examiner

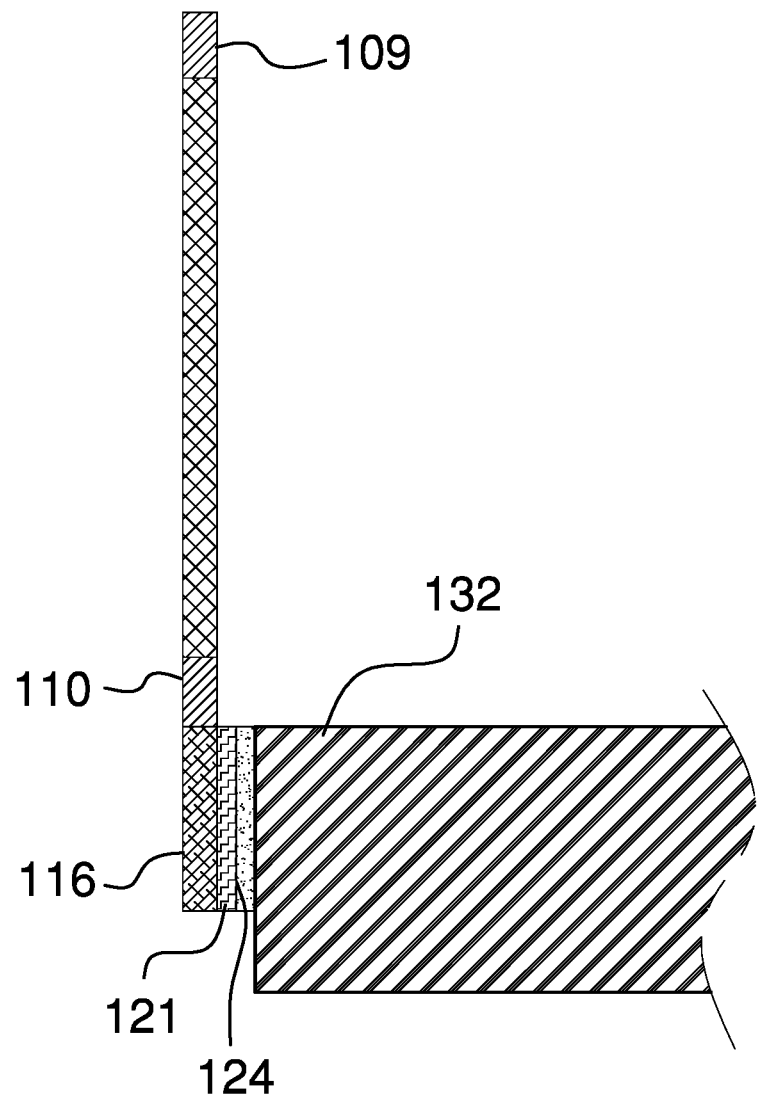

(page 1 of 2)

FOOD-RETAINING NET FOR USE WITH A FOOD TRAY AND HIGH CHAIR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of accessories for furniture adapted for use by children, a netting that is adapted for use with a high chair that is designed to contain food within the tray.

SUMMARY OF INVENTION

The food-retaining net for use with a food tray and high chair is a barrier that prevents objects from falling or being knocked off the tray of a high chair. The food-retaining net for use with a food tray and high chair is a framework structure that partially surrounds the tray of a high chair. The framework structure is covered with a mesh fabric that forms the barrier to prevent objects from falling off the falling or being knocked off the tray of a high chair. The framework structure is directly attached to the tray of the high chair using a fastener.

These together with additional objects, features and advantages of the food-retaining net for use with a food tray and high chair will be readily apparent to those of ordinary skill in the art upon reading the following detailed description of the presently preferred, but nonetheless illustrative, embodiments when taken in conjunction with the accompanying drawings.

In this respect, before explaining the current embodiments of the food-retaining net for use with a food tray and high chair in detail, it is to be understood that the food-retaining net for use with a food tray and high chair is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the food-retaining net for use with a food tray and high chair.

It is therefore important that the claims be regarded as including such equivalent construction insofar as they do not depart from the spirit and scope of the food-retaining net for use with a food tray and high chair. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a cross-sectional view of an embodiment of the disclosure across line 5-5 in FIG. 1.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
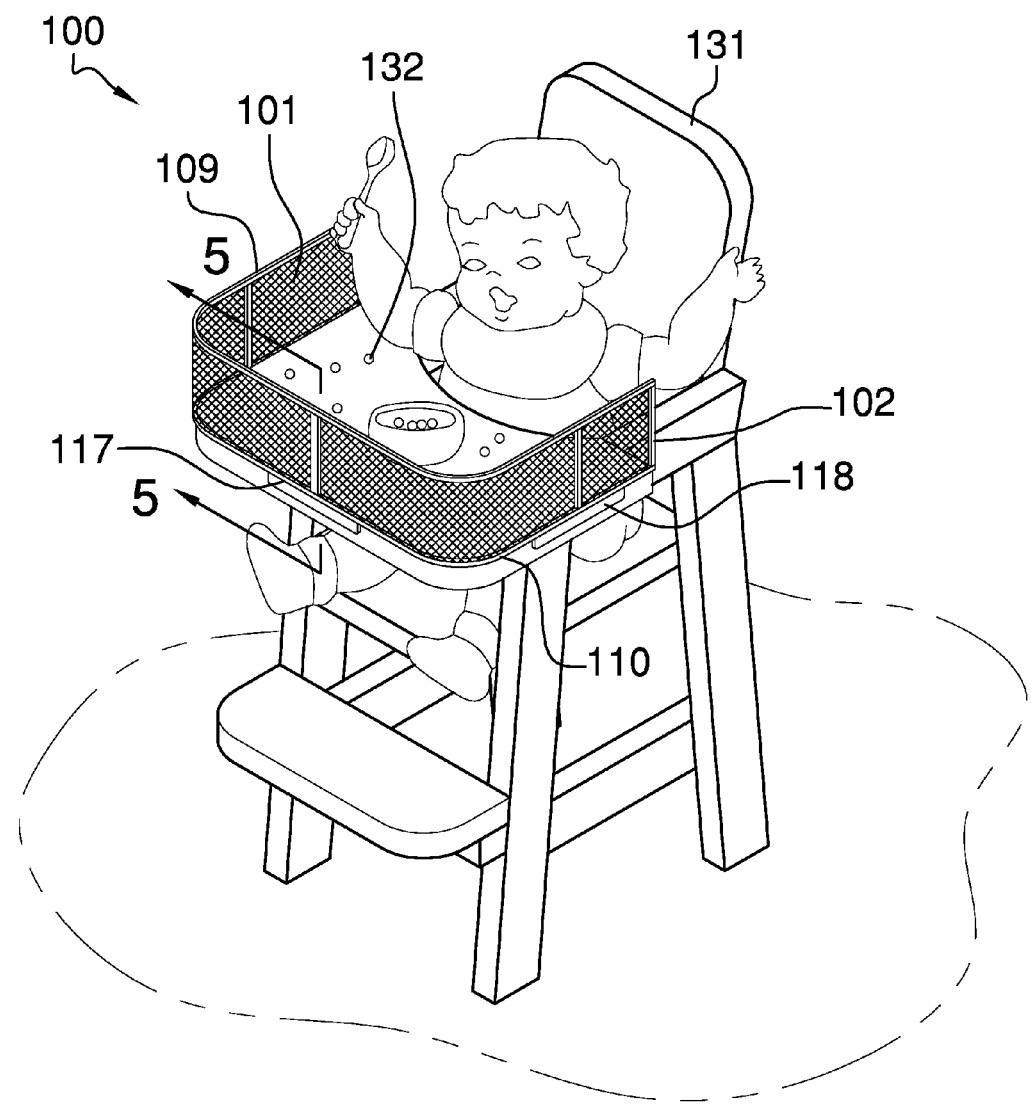
FIG. 1 is an in use of an embodiment of the disclosure.
Figure 2:
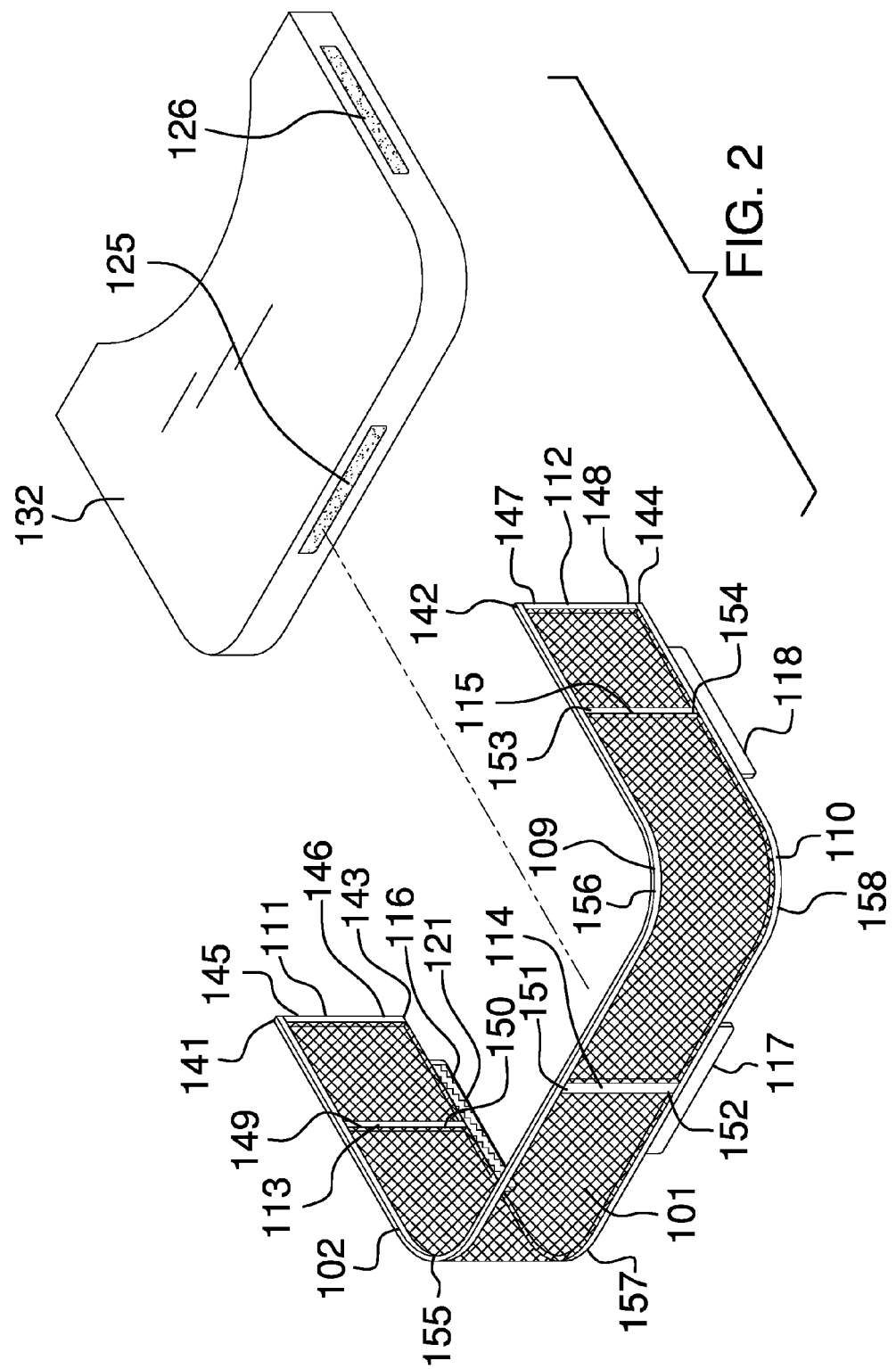
FIG. 2 is a perspective exploded view of an embodiment of the disclosure.
Figure 3:
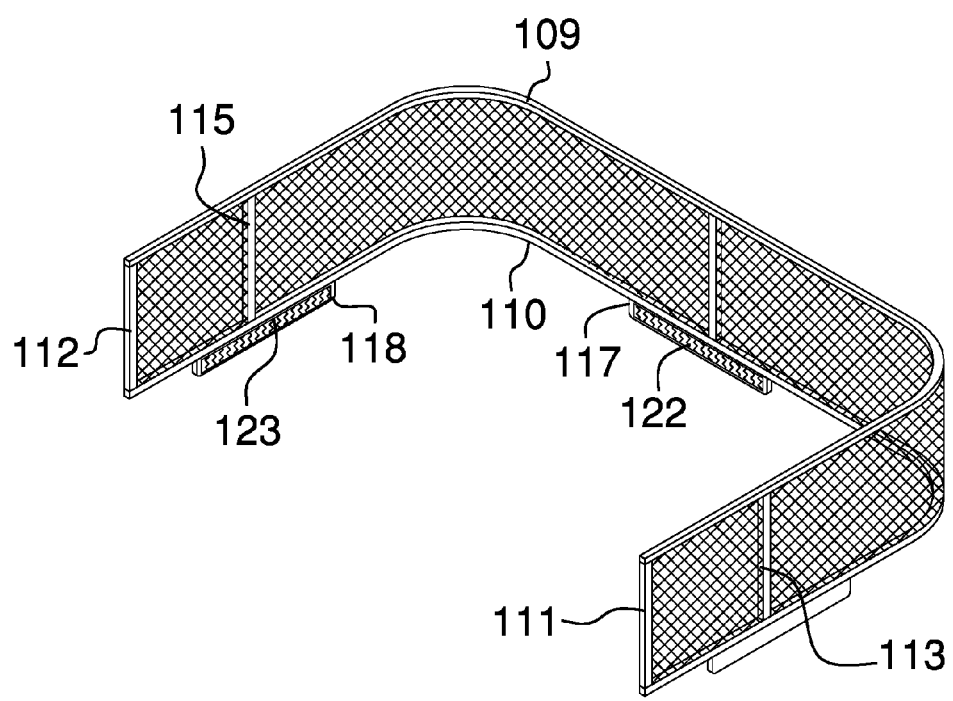
FIG. 3 is a detail view of an embodiment of the disclosure.
Figure 4:
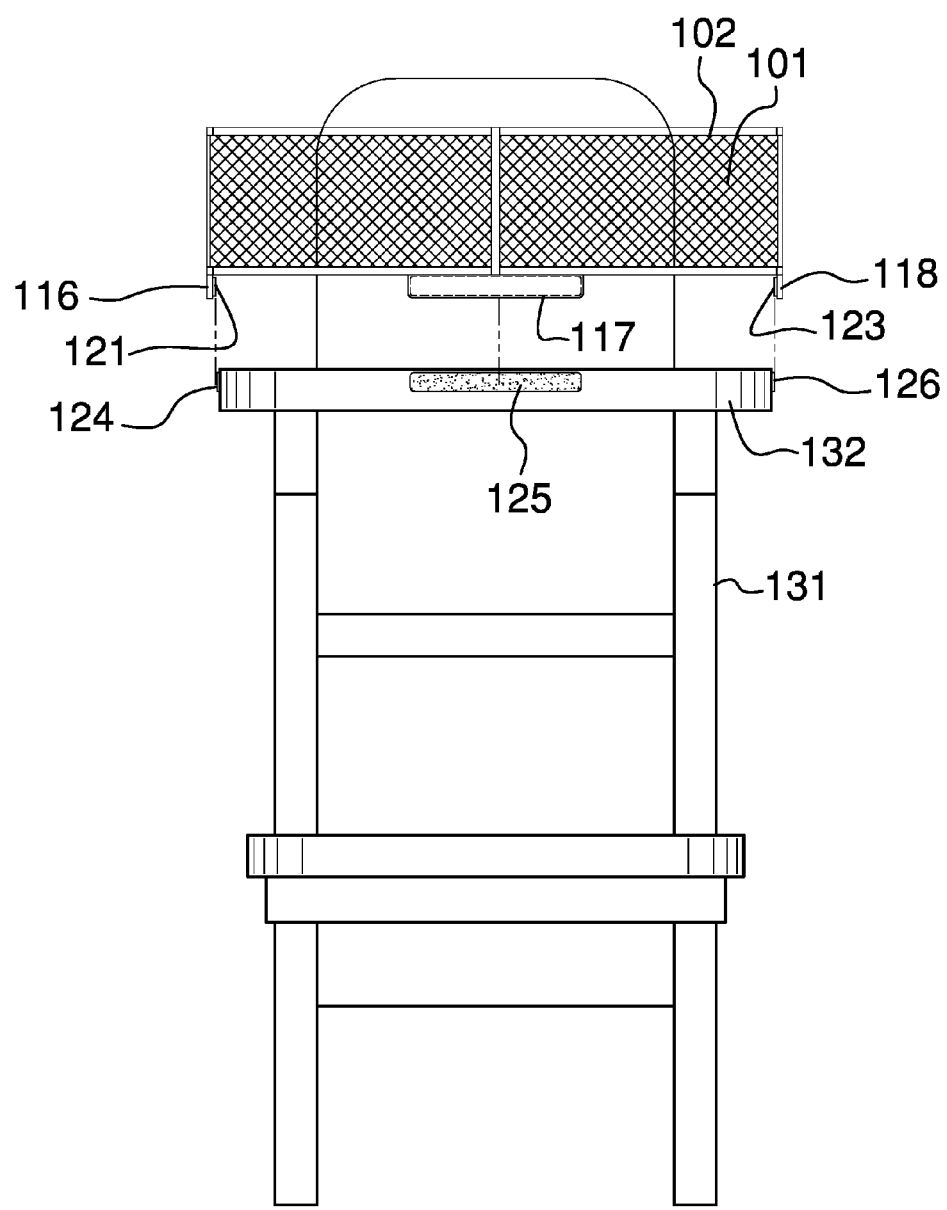
FIG. 4 is a front view of an embodiment of the disclosure.

Detailed reference will now be made to a first potential embodiment of the disclosure, which is illustrated in FIGS. 1 through 5.

The food-retaining net for use with a food tray and high chair 100 (hereinafter invention) further comprises a mesh textile 101 and a framework structure 102. The invention 100 is adapted for use with a high chair 131. Specifically, the invention 100 is designed to wrap around the sides of the tray 132 of a high chair 131 to prevent food and other objects from falling off the tray 132 and onto the ground.

The mesh textile 101 comprises a commercially available textile netting. The mesh textile 101 is cut into the form of a rectangle and is attached directly to the framework structure 102. Portions of the mesh textile 101 that extend beyond the span of the framework structure 102 can be cut away. The mesh textile 101 can be attached to the framework structure 102 using a method selected from the group consisting of: attaching the mesh textile 101 to the framework structure 102 using glue; or, tying the mesh textile 101 to the framework structure 102 using cord or cable ties.

The framework structure 102 further comprises a top rail 109, a bottom rail 110, a first strut 111, a second strut 112, a third strut 113, a fourth strut 114, a fifth strut 115, a first extension 116, a second extension 117, and a third extension 118. The top rail 109 is a U shaped shaft that is further defined with first end 141 and a second end 142. The bottom rail 110 is a U shaped shaft that is further defined with a third end 143 and a fourth end 144. The first strut 111 is a straight shaft that is further defined with a fifth end 145 and a sixth end 146. The second strut 112 is a straight shaft that is further defined with a seventh end 147 and an eighth end 148. The third strut 113 is a straight shaft that is further defined with a ninth end 149 and a tenth end 150. The fourth strut 114 is a straight shaft that is further defined with an eleventh end 151 and a twelfth end 152. The fifth strut 115 is a straight shaft that is further defined with a thirteenth end 153 and a fourteenth end 154. The U shape of the top rail 109 is formed with a first bend 155 and a second bend 156. The first bend 155 is a 90 degree bend that is proximal to the first end 141. The second bend 156 is a 90 degree bend that is proximal to the second end 142. The U shape of the bottom rail 110 is formed with a third bend 157 and a fourth bend 158. The third bend 157 is a 90 degree bend that is proximal to the third end 143. The fourth bend 158 is a 90 degree bend that is proximal to the fourth end 144.

The fifth end 145 of the first strut 111 is attached to the first end 141 of the top rail 109 such that the first strut 111 projects perpendicularly away from the top rail 109. The sixth end 146 of the first strut 111 is attached to the third end 143 of the bottom rail 110 such that the first strut 111 projects perpendicularly away from the bottom rail 110. The seventh end 147 of the second strut 112 is attached to the second end 142 of the top rail 109 such that the second strut 112 projects perpendicularly away from the top rail 109. The eighth end 148 of the second strut 112 is attached to the fourth end 144 of the bottom rail 110 such that the second strut 112 projects perpendicularly away from the bottom rail 110. The ninth end 149 of the third strut 113 is attached to the top rail 109 such that the third strut 113 projects perpendicularly away from the top rail 109.

The third strut 113 is positioned approximately halfway between the first end 141 and the first bend 155. The tenth end 150 of the third strut 113 is attached to the bottom rail 110 such that the third strut 113 projects perpendicularly away from the bottom rail 110. The third strut 113 is positioned approximately halfway between the third end 143 and the third bend 157. The eleventh end 151 of the fourth strut 114 is attached to the top rail 109 such that the fourth strut 114 projects perpendicularly away from the top rail 109. The fourth strut 114 is positioned approximately halfway between the first bend 155 and the second bend 156. The twelfth end 152 of the fourth strut 114 is attached to the bottom rail 110 such that the fourth strut 114 projects perpendicularly away from the bottom rail 110.

The fourth strut 114 is positioned approximately halfway between the third bend 157 and the fourth bend 158. The thirteenth end 153 of the fifth strut 115 is attached to the top rail 109 such that the fifth strut 115 projects perpendicularly away from the top rail 109. The fifth strut 115 is positioned approximately halfway between the second bend 156 and the second end 142. The fourteenth end 154 of the fifth strut 115 is attached to the bottom rail 110 such that the fifth strut 115 projects perpendicularly away from the bottom rail 110. The fifth strut 115 is positioned approximately halfway between the fourth bend 158 and the fourth end 144.

The first extension 116, the second extension 117, and the third extension 118 are rectangular structures that project away from the bottom rail 110. The first extension 116, the second extension 117, and the third extension 118 provide the surface upon which fasteners are placed to attach the structure to the tray 132 of the high chair 131. The fasteners are discussed in more detail elsewhere in this disclosure. The first extension 116 projects away from the bottom rail 110 from the side of the bottom rail 110 that is distal to the side of the bottom rail 110 that is attached to the tenth end 150 of the third strut 113.

The center of the rectangular structure of the first extension 116 is aligned with the center axis of the third strut 113. The second extension 117 projects away from the bottom rail 110 from the side of the bottom rail 110 that is distal to the side of the bottom rail 110 that is attached to the twelfth end 152 of the fourth strut 114. The center of the rectangular structure of the second extension 117 is aligned with the center axis of the fourth strut 114. The third extension 118 projects away from the bottom rail 110 from the side of the bottom rail 110 that is distal to the side of the bottom rail 110 that is attached to the fourteenth end 154 of the fifth strut 115. The center of the rectangular structure of the third extension 118 is aligned with the center axis of the fifth strut 115.

In the first potential embodiment of the disclosure, the framework structure 102 is fastened to the tray 132 of the highchair 131 using a first hook or loop surface 121, a second hook or loop surface 122, a third hook or loop surface 123, a fourth hook or loop surface 124, a fifth hook or loop surface 125 and a sixth hook or loop surface 126.

The first hook or loop surface 121 is attached to the first extension 116 using adhesive. The second hook or loop surface 122 is attached to the second extension 117 using adhesive. The third hook or loop surface 123 is attached to the third extension 118 using adhesive. The fourth hook or loop surface 124 is attached to the high chair 131 tray 132 such that the fourth hook or loop surface 124 will attach to the first hook or loop surface 121 during normal usage of the invention 100. The fourth hook or loop surface 124 is attached to the high chair 131 tray 132 with adhesive. The fifth hook or loop surface 125 is attached to the high chair 131 tray 132 such that the fifth hook or loop surface 125 will attach to the second hook or loop surface 122 during normal usage of the invention 100. The fifth hook or loop surface 125 is attached to the high chair 131 tray 132 with adhesive. The sixth hook or loop surface 126 is attached to the high chair 131 tray 132 such that the sixth hook or loop surface 126 will attach to the third hook or loop surface 123 during normal usage of the invention 100. The sixth hook or loop surface 126 is attached to the high chair 131 tray 132 with adhesive.

To use the invention 100, the framework structure 102 is attached to the high chair 131 by pressing the first hook or loop surface 121 against the fourth hook or loop surface 124, pressing the second hook or loop surface 122 against the fifth hook or loop surface 125, and pressing the third hook or loop surface 123 against the sixth hook or loop surface 126.

In the first potential embodiment of the disclosure, the framework structure 102 is made as a single unit from molded plastic. Suitable plastics include, but are not limited to polyethylene or polyvinyl chloride. The mesh textile 101 is commercially available. The hook and loop fasteners discussed in this disclosure are readily and commercially available.

The following definitions were used in this disclosure:

Cable Tie: As used in this disclosure, a cable tie is a type of fastener that is used to tie two objects together. The cable tie has a box end and an open end. The box end further comprises a gear like structure wherein when the open end is inserted into the gear like structure, the gear like structure acts as a ratchet that prevents the open end from being removed from the gear like structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Cord: As used in this disclosure, a cord is a long, thin, and flexible piece of string, line, or rope.

Fastener: As used in this disclosure, a fastener is a device that is used to join or affix two objects. Fasteners generally comprise a first part, which is attached to the first object and a second part, which is attached to the second object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fasten to the plurality of loops securely fastening the hook surface to the loop surface. A note on usage: when fastening a two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook or loop fastener or the loop surface of a hook and loop fastener is attached to an object this will simply be referred to as the "hook or loop surface" with the understanding that when the two objects are fastened together one of the two objects will have a hook surface and the remaining object will have the loop surface.

Mesh: As used in this disclosure, the term mesh refers to an openwork fabric made from threads, yarns, cords, wires, or lines that are woven, knotted, or otherwise twisted or intertwined at regular intervals. Synonyms for mesh include net.

Textile: As used his disclosure, a textile material that is woven, knitted, or felted. Synonyms in common usage for this definition include fabric and cloth.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A food-retaining net comprising:
a mesh textile and a framework structure;
wherein the food-retaining net is adapted for use with a high chair;
wherein the food-retaining net is adapted to wrap around three sides of a tray of the high chair;
wherein the food-retaining net prevents objects from falling off the tray of the high chair;
wherein the food-retaining net is attachable and detachable to the tray of the high chair;
wherein the mesh textile is cut into a rectangular shape;
wherein the mesh textile is attached to the framework structure;
wherein the mesh textile is attached to the framework structure using cable ties or tying the mesh textile to the framework structure using cord;
wherein the framework structure further comprises a top rail, a bottom rail, a first strut, a second strut, a third strut, a fourth strut, a fifth strut, a first extension, a second extension, and a third extension.

2. The food-retaining net according to claim 1 wherein the top rail is a U shaped shaft that is further defined with first end and a second end;
wherein the bottom rail is a U shaped shaft that is further defined with a third end and a fourth end;
wherein the first strut is a straight shaft that is further defined with a fifth end and a sixth end;
wherein the second strut is a straight shaft that is further defined with a seventh end and an eighth end;
wherein the third strut is a straight shaft that is further defined with a ninth end and a tenth end;
wherein the fourth strut is a straight shaft that is further defined with an eleventh end and a twelfth end;
wherein the fifth strut is a straight shaft that is further defined with a thirteenth end and a fourteenth end.

3. The food-retaining net according to claim 2 wherein the U shape of the top rail is formed with a first bend and a second bend;
wherein the first bend is a 90 degree bend that is proximal to the first end;
wherein the second bend is a degree bend that is proximal to the second end;
wherein U shape of the bottom rail is formed with a third bend and a fourth bend;
wherein the third bend is a 90 degree bend that is proximal to the third end;
wherein the fourth bend is a 90 degree bend that is proximal to the fourth end.

4. The food-retaining net according to claim 3 wherein the fifth end of the first strut is attached to the first end of the top rail such that the first strut projects perpendicularly away from the top rail;
wherein the sixth end of the first strut is attached to the third end of the bottom rail such that the first strut projects perpendicularly away from the bottom rail;
wherein the seventh end of the second strut is attached to the second end of the top rail such that the second strut projects perpendicularly away from the top rail;
wherein the eighth end of the second strut is attached to the fourth end of the bottom rail such that the second strut projects perpendicularly away from the bottom rail.

5. The food-retaining net according to claim 4 wherein the third strut is positioned between the first end and the first bend;
wherein the third strut is positioned between the third end and the third bend;
wherein the ninth end of the third strut is attached to the top rail such that the third strut projects perpendicularly away from the top rail;
wherein the tenth end of the third strut is attached to the bottom rail such that the third strut projects perpendicularly away from the bottom rail.

6. The food-retaining net according to claim 5 wherein the fourth strut is positioned between the first bend and the second bend;
wherein the fourth strut is positioned between the third bend and the fourth bend;
wherein the eleventh end of the fourth strut is attached to the top rail such that the fourth strut projects perpendicularly away from the top rail;
wherein the twelfth end of the fourth strut is attached to the bottom rail such that the fourth strut projects perpendicularly away from the bottom rail.

7. The food-retaining net according to claim 6 wherein the fifth strut is positioned approximately halfway between the second bend and the second end;
wherein the fifth strut is positioned approximately halfway between the fourth bend and the fourth end;
wherein the thirteenth end of the fifth strut is attached to the top rail such that the fifth strut projects perpendicularly away from the top rail;
wherein the fourteenth end of the fifth strut is attached to the bottom rail such that the fifth strut projects perpendicularly away from the bottom rail.

8. The food-retaining net according to claim 7 wherein the first extension a rectangular structures that projects away from the bottom rail;
wherein the second extension a rectangular structures that projects away from the bottom rail;
wherein the third extension is a rectangular structures that projects away from the bottom rail.

9. The food-retaining net according to claim 8 wherein the center of the rectangular structure of the first extension is aligned with the center axis of the third strut;
wherein the center of the rectangular structure of the second extension is aligned with the center axis of the fourth strut;
wherein the center of the rectangular structure of the third extension is aligned with the center axis of the fifth strut.

10. The food-retaining net according to claim 9 wherein the framework structure is fastened to the tray of the highchair using a first hook or loop surface, a second hook or loop surface, a third hook or loop surface, a fourth hook or loop surface, a fifth hook or loop surface and a sixth hook or loop surface.

11. The food-retaining net according to claim 10 wherein the first hook or loop surface is attached to the first extension;
wherein the second hook or loop surface is attached to the second extension;
wherein the third hook or loop surface is attached to the third extension.

12. The food-retaining net according to claim 11 wherein the fourth hook or loop surface is attached to the high chair tray;
wherein the fifth hook or loop surface is attached to the high chair tray;
wherein the sixth hook or loop surface is attached to the high chair tray.

13. The food-retaining net according to claim 12 wherein the fourth hook or loop surface is positioned on the high chair tray such that the fourth hook or loop surface will attach to the first hook or loop surface;
wherein the fifth hook or loop surface is positioned on the high chair tray such that the fifth hook or loop surface will attach to the second hook or loop surface;
wherein the sixth hook or loop surface is positioned on the high chair tray such that the sixth hook or loop surface will attach to the third hook or loop surface.

* * * * *